(12) United States Patent
Knowles

(10) Patent No.: US 8,484,442 B2
(45) Date of Patent: *Jul. 9, 2013

(54) APPARATUS AND METHOD FOR CONTROL PROCESSING IN DUAL PATH PROCESSOR

(75) Inventor: Simon Knowles, Bath (GB)

(73) Assignee: Icera Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/964,525

(22) Filed: Dec. 9, 2010

(65) Prior Publication Data

US 2011/0078416 A1    Mar. 31, 2011

Related U.S. Application Data

(62) Division of application No. 10/813,628, filed on Mar. 31, 2004, now Pat. No. 7,949,856.

(51) Int. Cl.
*G06F 9/30* (2006.01)
(52) U.S. Cl.
USPC ........................................... 712/215
(58) Field of Classification Search
USPC .................. 712/1–4, 7, 9, 10, 11, 13, 16, 22, 712/24, 208, 210, 214–215, 220, 221, 223, 712/225
See application file for complete search history.

(56) References Cited

U.S. PATENT DOCUMENTS

| | | |
|---|---|---|
| 4,228,498 A | 10/1980 | Moshier |
| 5,136,697 A | 8/1992 | Johnson |
| 5,423,051 A | 6/1995 | Fuller |
| 5,600,801 A | 2/1997 | Parks et al. |
| 5,600,810 A | 2/1997 | Ohkami |
| 5,737,631 A | 4/1998 | Trimberger |
| 5,901,301 A | 5/1999 | Matsuo et al. |
| 5,922,065 A | 7/1999 | Hull et al. |
| 5,956,518 A | 9/1999 | DeHon et al. |
| 5,968,167 A | 10/1999 | Whittaker et al. |
| 6,044,450 A | 3/2000 | Tsushima et al. |

(Continued)

FOREIGN PATENT DOCUMENTS

| | | |
|---|---|---|
| EP | 0419105 A2 | 3/1991 |
| EP | 0789297 A2 | 5/1996 |

(Continued)

OTHER PUBLICATIONS

Transit Note #95; Unifying EPGAs and SIMD Arrays; Michael Bolotski, Andre DeHon, and Thomas F. Knight, Jr.; Original Issue: Sep. 1993, Last Updated: Feb. 8, 1994; 22 pages.

(Continued)

*Primary Examiner* — Idriss N Alrobaye
*Assistant Examiner* — Richard B Franklin

(57) ABSTRACT

A computer processor comprises a decode unit and a processing channel. The decode unit decodes a stream of instruction packets from a memory, each instruction packet comprising a plurality of instructions. The processing channel comprises a plurality of functional units and operable to perform control processing operations. The decode unit is operable to receive and decode instruction packets of a bit length of 64 bits and to detect if the instruction packet defines three control instructions each having a length of 21 bits. The decode unit detects that the instruction packet comprises the three control instructions. The control instructions are supplied to the processing channel for execution in the order in which they appear in the instruction packet. The detection uses an identification bit in the instruction packet.

6 Claims, 3 Drawing Sheets

U.S. PATENT DOCUMENTS

| | | | |
|---|---|---|---|
| 6,052,773 | A | 4/2000 | DeHon et al. |
| 6,061,367 | A | 5/2000 | Siemers |
| 6,115,806 | A * | 9/2000 | Yoshida ................. 712/210 |
| 6,226,735 | B1 | 5/2001 | Mirsky |
| 6,255,849 | B1 | 7/2001 | Mohan |
| 6,292,845 | B1 | 9/2001 | Fleck et al. |
| 6,526,430 | B1 | 2/2003 | Hung et al. |
| 6,721,884 | B1 | 4/2004 | De Oliveira Kastrup Pereira et al. |
| 6,725,357 | B1 | 4/2004 | Cousin |
| 6,798,239 | B2 | 9/2004 | Douglass et al. |
| 6,880,150 | B1 | 4/2005 | Takayama et al. |
| 6,976,245 | B2 | 12/2005 | Takayama et al. |
| 6,976,250 | B2 * | 12/2005 | Takayama et al. ............ 717/151 |
| 7,039,790 | B1 | 5/2006 | Simar, Jr. et al. |
| 7,120,781 | B1 | 10/2006 | Kolagotla et al. |
| 7,159,099 | B2 | 1/2007 | Lucas et al. |
| 7,176,713 | B2 | 2/2007 | Madurawe |
| 7,234,042 | B1 | 6/2007 | Wilson |
| 7,237,089 | B2 | 6/2007 | Suzuki |
| 7,366,874 | B2 | 4/2008 | Seong et al. |
| 7,949,856 | B2 | 5/2011 | Knowles |
| 2002/0010852 | A1 | 1/2002 | Arnold et al. |
| 2002/0063577 | A1 | 5/2002 | Abbott |
| 2002/0089348 | A1 | 7/2002 | Langhammer |
| 2002/0174266 | A1 | 11/2002 | Palem et al. |
| 2002/0198606 | A1 | 12/2002 | Satou |
| 2003/0154258 | A1 | 8/2003 | Kakimoto et al. |
| 2003/0154358 | A1 | 8/2003 | Seong et al. |
| 2004/0054876 | A1 | 3/2004 | Grisenthwaite et al. |
| 2004/0215593 | A1 | 10/2004 | Sharangpani et al. |
| 2005/0044443 | A1 | 2/2005 | Kahle et al. |
| 2005/0223193 | A1 | 10/2005 | Knowles |

FOREIGN PATENT DOCUMENTS

| | | | |
|---|---|---|---|
| EP | 1050810 A1 | 8/2000 | |
| JP | 5324430 A | 12/1993 | |
| JP | 9212361 A | 8/1997 | |
| JP | 9265397 A | 10/1997 | |
| JP | 11282674 A | 10/1999 | |
| JP | 2000509528 | 7/2000 | |
| JP | 2000509528 T | 7/2000 | |
| JP | 2001236496 A | 8/2001 | |
| JP | 2001306321 A | 11/2001 | |
| JP | 20000600174T A | 11/2002 | |
| JP | 2003005958 A | 1/2003 | |
| JP | 2003099397 | 4/2003 | |
| JP | 2003110604 | 4/2003 | |
| JP | 2003167728 A | 6/2003 | |
| JP | 2004309570 | 11/2004 | |
| JP | 2005531848 T | 10/2005 | |
| KR | 20030067892 A | 8/2003 | |
| TW | 516320 B | 1/2003 | |
| TW | 543000 B | 7/2003 | |
| TW | 559709 B | 11/2003 | |
| TW | 569138 B | 1/2004 | |
| TW | 200401187 | 1/2004 | |
| WO | WO 01/63923 A1 | 8/2001 | |

OTHER PUBLICATIONS

A Brief Look at the PowerPC 970 by Jon "Hannibal" Stokes; 3 pages.
Structured Computer Organization; Second Edition; Andrew S. Tanenbaum; 5 pages.
Hennessy, John and Patterson, David, "Computer Architecture: A Quantitative Approach," Unknown Edition, May 2003, pp. 127-130 and sections D-1 through D-14.
European Search Report for App No. 05 729 441.5-1243, dated Oct. 21, 2009, 3 pages.
Korean Related Case, Korean Application No. 10-2006-7020244 Office Action, dated Jun. 20, 2011, 6 pages.
Beebe, B.O., et al., "Instruction Sequencing Control," IBM Technical Disclosure Bulletin, vol. 14, May 1972, pp. 3599-3611.
PCT Search Report and Written Opinon, for App. No. PCT/GB2005/001059, dated May 19, 2006, 13 pages.
Japanese Related Case, Japanese Application No. 2007-505612 Office Action dated Mar. 11, 2011, 10 pages.
PCT Preliminary Report on Patentablility for App. No. PCT/GB2005/001069, dated Oct. 12, 2006, 8 pages.
Korean Related Case, Korean Application No. 10-2006-7020245 Office Action, dated Jun. 23, 2011, 5 pages.
Simon D. Haynes et al.; "Configurable Multiplier Blocks for Use Within an FPGA"; Department of Electrical and Electronic Engineering, Imperial College, London, England; Date: Unknown; 6 pages.
Andrea Lodi, et al.; A Flexible Lut-Based Carry Chain for FPGas Advanced Research Center on Electronic Systems, University of Bologna, Italy; 2003 IEEE; pp. V-133 - V-136.
Related Taiwan Office Action; Translation of the First Examination Report; 12 pp.
Cameron McNairy and Don Soltis; Itanium 2 Processor Microarchitecture; IEEE Computer Society; vol. 23 Issue 2; Mar.-Apr. 2003; pp. 2-14.
Intel; Intel Itanium Architecture Software DeveloINTEL; er's Manual; vol. 1: Application Architecture, Revision 2.1; Oct. 2002; Document Number: 245317-004; 11 pages.
Related Taiwan Office Action; Translation of the First Examination Report; 12 pp, Date: 2011.
Related Japanese Office Action; Notice of Reasons for Rejection; Mailing No. 168505; Dated Mar. 13, 2012; 7 pp.
Simon D. Haynes et al.; "Configurable Multiplier Blocks for Use Within an FPGA"; Department of Electrical and Electronic Engineering, Imperial College, London, England; Date; 6 pages, Date: Mar. 2000.
Andrea Lodi, et al.; A Flexible Lut-Based Carry Chain for FPGas Advanced Research Center on Electronic Systems, University of Bologna, Italy; 2003 IEEE; pp. V-133-V-136.
J. Brandt; PCT International Search Report; Applicant's or Agent's File Reference 600591PWO/JH/DG; International Application No. PCT/GB2005/001073; Apr. 5, 2006; 4 pages.
Determining the Optimum Extended Instruction-Set Architecture for Application Specific Reconfigurable VLIW CPUs; 2001 IEEE; pp. 50-56.
Instruction Sequencing Control; IBM Technical Disclosure Bulletin; Beebe, Cocke, Earle, Holleran, Homan, Robelan, Shivdasani and Sussenguth; vol. 14 No. 12 May 1972; pp. 3599-3611.
Variable-Length Instruction Compression for Area Minimization; IEEE 2003; Simonsen, Saastamoinen and Nurmi; 2 Pages.
Structured Computer Organization; Second Edition; Andrew S. Tanenbaum; 5 pages; 1984.
Simonen, P., et al., "Variable-Length Instruction Compression for Area Minimization," IEEE, 2003, 6 pages.
Translation of Taiwan Office Action, Taiwan Application No. 094109124, Feb. 1, 2013, 10 pages.
Jacob, J. A., et al., "Memory Interfacing and Instruction Specification for Reconfigurable Processors," 1999, pp. 145-154.
Taiwan Office Action dated Oct. 4, 2011 (english translation), 12 pages.
Stallings, W., "Computer Organization and Architecture Designing for Performance Fifth Edition," Publishing House of Electronics Industry, May 2001, 3 pages.
Chinese office action, Feb. 15, 2008, Applicant: Icera, Inc., Application No. 200580010665, 21 pages.
Stallings, W., "Computer Organization and Architecture Designing for Performance Eighth Edition," 2010, Prentice Hall, 4 pages.

* cited by examiner

US 8,484,442 B2

APPARATUS AND METHOD FOR CONTROL PROCESSING IN DUAL PATH PROCESSOR

CROSS REFERENCE TO RELATED APPLICATION

This Application is a Divisional of U.S. application Ser. No. 10/813,628 filed on Mar. 31, 2004 now U.S. Pat. No. 7,949,856, to Simon Knowles, entitled "APPARATUS AND METHOD FOR CONTROL PROCESSING IN DUAL PATH PROCESSOR"; commonly assigned with the present invention and incorporated herein by reference.

TECHNICAL FIELD

This invention relates to a computer processor, a method of operating the same, and a computer program product comprising an instruction set for the computer.

BACKGROUND

In order to increase the speed of computer processors, prior art architectures have used dual execution paths for executing instructions. Dual execution path processors can operate according to a single instruction multiple data (SIMD) principle, using parallelism of operations to increase processor speed.

However, despite use of dual execution paths and SIMD processing, there is an ongoing need to increase processor speed. Typical dual execution path processors use two substantially identical channels, so that each channel handles both control code and datapath code. While known processors support a combination of 32-bit standard encoding and 16-bit "dense" encoding, such schemes suffer from several disadvantages, including a lack of semantic content in the few bits available in a 16-bit format.

Furthermore, conventional general purpose digital signal processors are not able to match application specific algorithms for many purposes, including performing specialized operations such as convolution, Fast Fourier Transforms, Trellis/Viterbi encoding, correlation, finite impulse response filtering, and other operations.

SUMMARY

In one embodiment according to the invention, there is provided a computer processor. The computer processor comprises a decode unit and a processing channel. The decode unit decodes a stream of instruction packets from a memory, each instruction packet comprising a plurality of instructions. The processing channel comprises a plurality of functional units and operable to perform control processing operations. The decode unit is operable to receive and decode instruction packets of a bit length of 64 bits and to detect if the instruction packet defines three control instructions each having a length of 21 bits. The decode unit detects that the instruction packet comprises the three control instructions. The control instructions are supplied to the processing channel for execution in the order in which they appear in the instruction packet. The detection uses an identification bit in the instruction packet.

In another embodiment according to the invention, there is provided a method of operating a computer processor which comprises a processing channel and is capable of performing control processing instructions having a plurality of functional units. The method comprises at least two steps. In a first step, a sequence of instruction packets from a memory is received. Each of the instruction packets comprises a plurality of instructions defining operations. The instruction packets include a class of packets having a bit length of 64 bits. In a second step, each instruction packet is decoded in turn by determining if the instruction packet defines three control instructions each having a bit length of 21 bits. The decoding uses an identification bit in the instruction packet where the decode unit detects that the instruction packet comprises three such control instructions supplying the plurality of control instructions to the processing channel for execution in the order in which they appear in the instruction packet.

In another embodiment according to the invention, there is disclosed an instruction set for a computer including a class of instruction packets having a bit length of 64 bits. Each packet comprises three control instructions for execution sequentially and each having a bit length of 21 bits and an identification bit.

BRIEF DESCRIPTION OF THE DRAWINGS

For a better understanding of the present invention, and to show how the same may be carried into effect, reference will now be made, by way of example only, to the accompanying drawings, in which.

DETAILED DESCRIPTION

Figure 1:
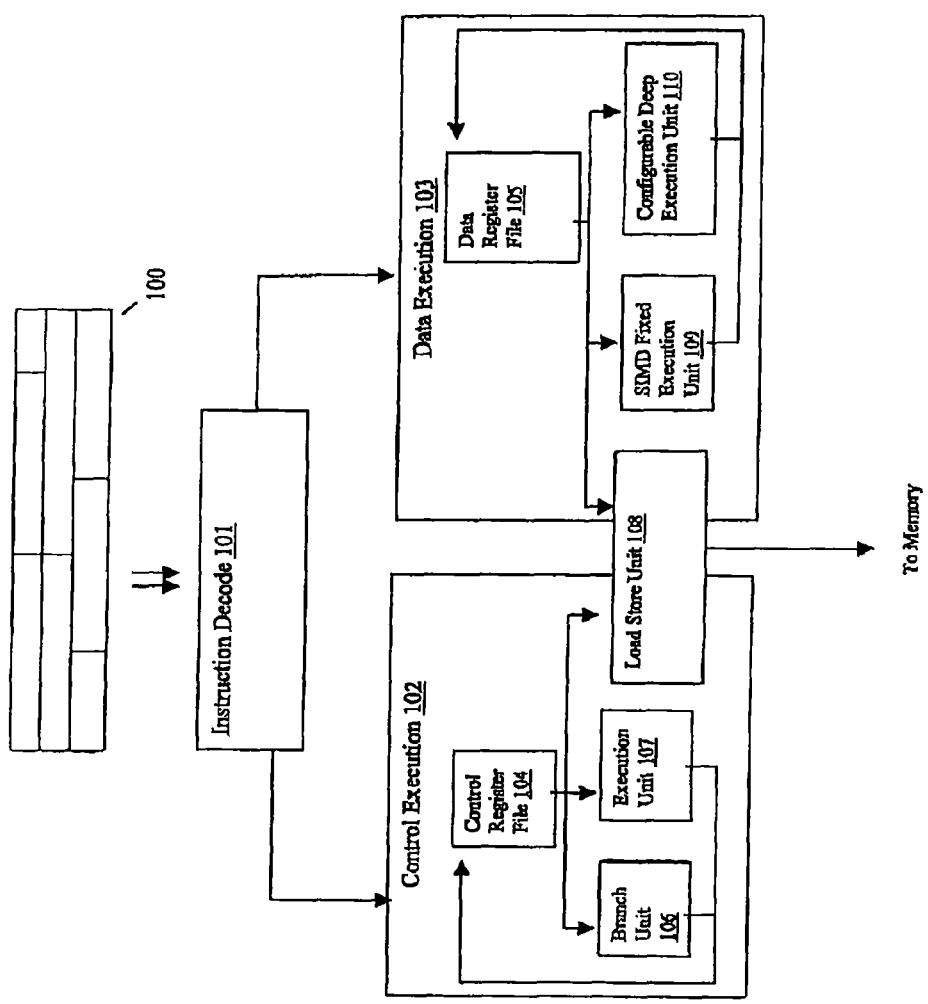
FIG. 1 is a block diagram of an asymmetric dual execution path computer processor, according to an embodiment of the invention.

Those skilled in the art to which this application relates will appreciate that other and further additions, deletions, substitutions and modifications may be made to the described embodiments. FIG. 1 is a block diagram of an asymmetric dual path computer processor, according to an embodiment of the invention. The processor of FIG. 1 divides processing of a single instruction stream 100 between two different hardware execution paths: a control execution path 102, which is dedicated to processing control code, and a data execution path 103, which is dedicated to processing data code. The data widths, operators, and other characteristics of the two execution paths 102,103 differ according to the different characteristics of control code and datapath code. Typically, control code favors fewer, narrower registers, is difficult to parallelize, is typically (but not exclusively) written in C code or another high-level language, and its code density is generally more important than its speed performance. By contrast, datapath code typically favors a large file of wide registers, is highly parallelizable, is written in assembly language, and its performance is more important than its code density. In the processor of FIG. 1, the two different execution paths 102 and 103 are dedicated to handling the two different types of code, with each side having its own architectural register file, such as control register file 104 and data register file 105, differentiated by width and number of registers; the control registers are of narrower width, by number of bits (in one example, 32-bits), and the data registers are of wider width (in one example, 64-bits). The processor is therefore asymmetric, in that its two execution paths are different bit-widths owing to the fact that they each perform different, specialized functions.

In the processor of FIG. 1, the instruction stream 100 is made up of a series of instruction packets. Each instruction packet supplied is decoded by an instruction decode unit 101, which separates control instructions from data instructions, as described further below. The control execution path 102 handles control-flow operations for the instruction stream, and manages the machine's state registers, using a branch unit 106, an execution unit 107, and a load store unit 108, which in this embodiment is shared with the data execution path 103. Only the control side of the processor need be visible to a compiler for the C, C++, or Java language, or another high-level language compiler. Within the control side, the operation of branch unit 106 and execution unit 107 is in accordance with conventional processor design known to those of ordinary skill in the art.

The data execution path 103 employs SIMD (single instruction multiple data) parallelism, in both a fixed execution unit 109 and a configurable deep execution unit 110. As will be described further below, the configurable deep execution unit 110 provides a depth dimension of processing, to increase work per instruction, in addition to the width dimension used by conventional SIMD processors.

If the decoded instruction defines a control instruction it is applied to the appropriate functional unit on the control execution path of the machine (e.g. branch unit 106, execution unit 107, and load/store unit 108). If the decoded instruction defines an instruction with either a fixed or configurable data processing operation it is supplied to the data processing execution path. Within the data instruction part of the instruction packet designated bits indicate whether the instruction is a fixed or configurable data processing instruction, and in the case of a configurable instruction further designated bits define configuration information. In dependence on the sub-type of decoded data processing instruction, data is supplied to either the fixed or the configurable execution sub-paths of the data processing path of the machine.

Herein, "configurable" signifies the ability to select an operator configuration from amongst a plurality of predefined ("pseudo-static") operator configurations. A pseudo-static configuration of an operator is effective to cause an operator (i) to perform a certain type of operation, or (ii) to be interconnected with associated elements in a certain manner, or (iii) a combination of (i) or (ii) above. In practice, a selected pseudo-static configuration may determine the behavior and interconnectivity of many operator elements at a time. It can also control switching configurations associated with the data path. In a preferred embodiment, at least some of the plurality of pseudo-static operator configurations are selectable by an operation-code portion of a data processing instruction, as will be illustrated further below. Also in accordance with embodiments herein, a "configurable instruction" allows the performance of customized operations at the level of multibit values; for example, at the level of four or more bit multibit values, or at the level of words.

It is pointed out that both control and data processing instructions, performed on their respective different sides of the machine, can define memory access (load/store) and basic arithmetic operations. The inputs/operands for control operations may be supplied to/from the control register file 104, whereas the data/operands for data processing operations are supplied to/from the register file 105.

In accordance with an embodiment of the invention, at least one input of each data processing operation can be a vector. In this respect, the configurable operators and/or switching circuitry of the configurable data pack can be regarded as configurable to perform vector operations by virtue of the nature of operation performed and/or interconnectivity therebetween. For example, a 64-bit vector input to a data processing operation may include four 16-bit scalar operands. Herein, a "vector" is an assembly of scalar operands. Vector arithmetic may be performed on a plurality of scalar operands, and may include steering, movement, and permutation of scalar elements. Not all operands of a vector operation need be vectors; for example, a vector operation may have both a scalar and at least one vector as inputs; and output a result that is either a scalar or a vector.

Herein, "control instructions" include instructions dedicated to program flow, and branch and address generation; but not data processing. "Data processing instructions" include instructions for logical operations, or arithmetic operations for which at least one input is a vector. Data processing instructions may operate on multiple data instructions, for example in SIMD processing, or in processing wider, short vectors of data elements. The essential functions of control instructions and data instructions just mentioned do not overlap; however, a commonality is that both types of code have logic and scalar arithmetic capabilities.

Figure 2:
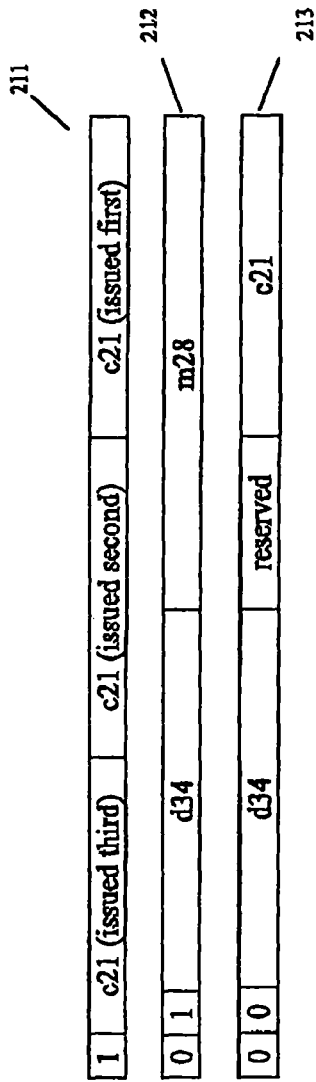
FIG. 2 shows exemplary classes of instructions for the processor of FIG. 1, according to an embodiment of the invention.

FIG. 2 shows three types of instruction packet for the processor of FIG. 1. Each type of instruction packet is 64-bits long. Instruction packet 211 is a 3-scalar type, for dense control code, and includes three 21-bit control instructions (c21). Instruction packets 212 and 213 are LIW (long instruction word) type, for parallel execution of datapath code. In this example each instruction packet 212, 213 includes two instructions but different numbers may be included if desired. Instruction packet 212 includes a 34-bit data instruction (d34) and a 28-bit memory instruction (m28); and is used for parallel execution of data-side arithmetic (the d34 instruction) with a data-side load-store operation (the m28 instruction). Memory-class instructions (m28) can be read from, or written to, either the control side or the data side of the processor, using addresses from the control side. Instruction packet 213 includes a 34-bit data instruction (d34) and a 21-bit control instruction (c21); and is used for parallel execution of data-side arithmetic (the d34 instruction) with a control-side operation (the c21 instruction), such as a control-side arithmetic, branching, or load-store operation.

Instruction decode unit 101 of the embodiment of FIG. 1 uses the initial identification bits, or some other designated identification bits at predetermined bit locations, of each instruction packet to determine which type of packet is being decoded. For example, as shown in FIG. 2, an initial bit "1" signifies that an instruction packet is of a scalar control instruction type, with three control instructions; while initial bits "0 1" and "0 0" signify instruction packets of type 212 and 213, with a data and memory instruction in packet 212 or a data and control instruction in packet 213. Having decoded the initial bits of each instruction packet, the decode unit 101 of FIG. 1 passes the instructions of each packet appropriately to either the control execution path 102 or the data execution path 103, according to the type of instruction packet.

In order to execute the instruction packets of FIG. 2, the instruction decode unit 101 of the processor of the embodiment of FIG. 1 fetches program packets from memory sequentially; and the program packets are executed sequentially. Within an instruction packet, the instructions of packet 211 are executed sequentially, with the 21-bit control instruction at the least significant end of the 64-bit word being executed first, then the next 21-bit control instruction, and then the 21-bit control instruction at the most-significant end. Within instruction packets 212 and 213, the instructions can be executed simultaneously (although this need not necessarily be the case, in embodiments according to the invention). Thus, in the program order of the processor of the embodiment of FIG. 1, the program packets are executed sequentially; but instructions within a packet can be executed either sequentially, for packet type 211, or simultaneously, for packet types 212 and 213. Below, instruction packets of types 212 and 213 are abbreviated as MD and CD-packets respectively (containing one memory and one data instruction; and one control instruction and one data instruction, respectively).

In using 21-bit control instructions, the embodiment of FIG. 1 overcomes a number of disadvantages found in processors having instructions of other lengths, and in particular processors that support a combination of 32-bit standard encoding for data instructions and 16-bit "dense" encoding for control code. In such dual 16/32-bit processors, there is a redundancy arising from the use of dual encodings for each instruction, or the use of two separate decoders with a means of switching between encoding schemes by branch, fetch address, or other means. This redundancy is removed by using a single 21-bit length for all control instructions, in accordance with an embodiment of the invention. Furthermore, use of 21-bit control instructions removes disadvantages arising from insufficient semantic content in a 16-bit "dense" encoding scheme. Because of insufficient semantic content, processors using a 16-bit scheme typically require some mix of design compromises, such as: use of two-operand destructive operations, with corresponding code bloat for copies; use of windowed access to a subset of the register file, with code bloat for spill/fill or window pointer manipulation; or frequent reversion to the 32-bit format, because not all operations can be expressed in the very few available opcode bits in a 16-bit format. These disadvantages are alleviated by use of 21-bit control instructions, in an embodiment of the invention.

A large variety of instructions may be used, in accordance with an embodiment of the invention. For example, instruction signatures may be any of the following, where C-format, M-format, and D-format signify control, memory access, and data format respectively:

| Instruction Signature | Arguments | Used By |
|---|---|---|
| instr | Instruction has no arguments | C-format only |
| instr dst | Instruction has a single destination argument | C-format only |
| instr src0 | Instruction has a single source argument | C- or D-format only |
| instr dst, src0 | Instruction has single destination, single source argument | D- and M-format instructions |
| instr dst, src0, src1 | Instruction has a single destination argument and two source arguments | C-, D-, and M- format instructions |

Also in accordance with one embodiment of the invention, the C-format instructions all provide SISD (single instruction single data) operation, while the M-format and D-format instructions provide either SISD or SIMD operation. For example, control instructions may provide general arithmetic, comparison, and logical instructions; control flow instructions; memory loads and store instructions; and others. Data instructions may provide general arithmetic, shift, logical, and comparison instructions; shuffle, sort, byte extend, and permute instructions; linear feedback shift register instructions; and, via the configurable deep execution unit 110 (described further below), user-defined instructions. Memory instructions may provide memory loads and stores; copy selected data registers to control registers; copy broadcast control registers to data registers; and immediate to register instructions.

In accordance with an embodiment of the invention, the processor of FIG. 1 features a first, fixed data execution path and a second configurable data execution path. The first data path has a fixed SIMD execution unit split into lanes in a similar fashion to conventional SIMD processing designs. The second data path has a configurable deep execution unit 110. "Deep execution" refers to the ability of a processor to perform multiple consecutive operations on the data provided by a single issued instruction, before returning a result to the register file. One example of deep execution is found in the conventional MAC operation (multiply and accumulate), which performs two operations (a multiplication and an addition), on data from a single instruction, and therefore has a depth of order two. Deep execution is characterized by the number of operands input being equal to the number of results output; or, equivalently, the valency-in equals the valency-out. Thus, for example, a conventional two-operand addition, which has one result, is not an example of deep execution, because the number of operands is not equal to the number of results; whereas convolution, Fast Fourier Transforms, Trellis/Viterbi encoding, correlators, finite impulse response filters, and other signal processing algorithms are examples of deep execution. Application-specific digital signal processing (DSP) algorithms do perform deep execution, typically at the bit level and in a memory-mapped fashion. However, conventional register-mapped general purpose DSP's do not perform deep execution, instead executing instructions at a depth of order two at most, in the MAC operation. By contrast, the processor of FIG. 1 provides a register-mapped general purpose processor that is capable of deep execution of dynamically configurable word-level instructions at orders greater than two. In the processor of FIG. 1, the nature of the deep execution instruction (the graph of the mathematical function to be performed) can be adjusted/customized by configuration information in the instruction itself. In the preferred embodiment, format instructions contain bit positions allocated to configuration information. To provide this capability, the deep execution unit 110 has configurable execution resources, which means that operator modes, interconnections, and constants can be uploaded to suit each application. Deep execution adds a depth dimension to the parallelism of execution, which is orthogonal to the width dimension offered by the earlier concepts of SIMD and LIW processing; it therefore represents an additional dimension for increasing work-per-instruction of a general purpose processor.

Figure 3:
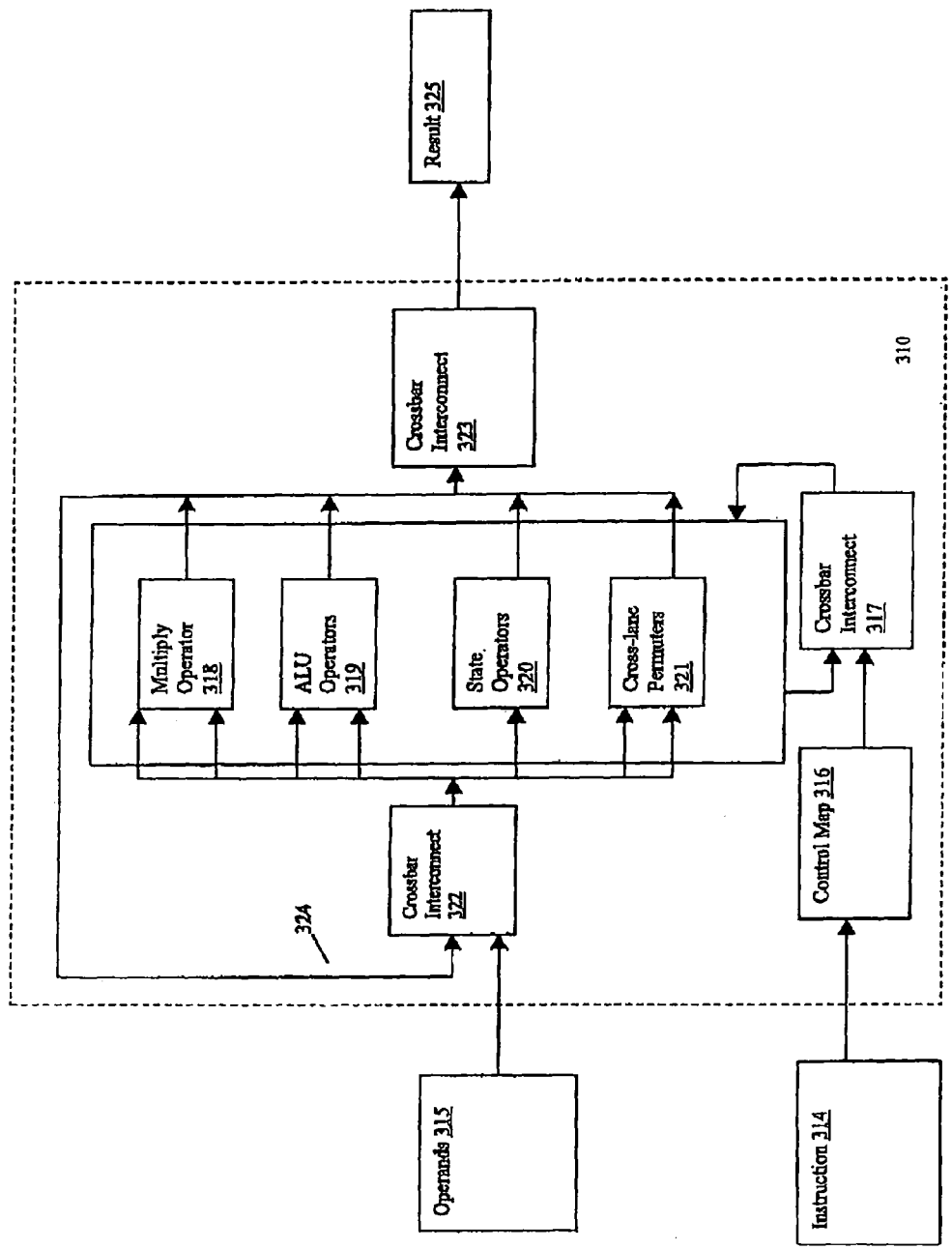
FIG. 3 is a schematic showing components of a configurable deep execution unit, in accordance with an embodiment of the invention.

FIG. 3 shows the components of a configurable deep execution unit 310, in accordance with an embodiment of the invention. As shown in FIG. 1, the configurable deep execution unit 110 is part of the data execution path 103, and may therefore be instructed by data-side instructions from the MD and CD-instruction packets 212 and 213 of FIG. 2. In FIG. 3, an instruction 314 and operands 315 are supplied to the deep execution unit 310 from instruction decode unit 101 and data register file 105 of FIG. 1. A multi-bit configuration code in the instruction 314 is used to access a control map 316, which expands the multi-bit code into a relatively complex set of configuration signals for configuring operators of the deep execution unit. The control map 316 may, for example, be embodied as a look-up table, in which different possible multi-bit codes of the instruction are mapped to different possible operator configurations of the deep execution unit. Based on the result of consulting the look-up table of the control map 316, a crossbar interconnect 317 configures a set of operators 318-321 in whatever arrangement is necessary to execute the operator configuration indicated by the multi-bit instruction code. The operators may include, for example, a multiply operator 318, an arithmetic logic unit (ALU) operator 319, a state operator 320, or a cross-lane permuter 321. In one embodiment, the deep execution unit contains fifteen operators: one multiply operator 318, eight ALU operators 319, four state operators 320, and two cross-lane permuters 321; although other numbers of operators are possible. The operands 315 supplied to the deep execution unit may be, for example, two 16-bit operands; these are supplied to a second crossbar interconnect 322 which may supply the operands to appropriate operators 318-321. The second crossbar interconnect 322 also receives a feedback 324 of intermediate results from the operator 318-321, which may then in turn also be supplied to the appropriate operator 318-321 by the second crossbar interconnect 322. A third crossbar interconnect 323 multiplexes the results from the operators 318-321, and outputs a final result 325. Various control signals can be used to configure the operators; for example, control map 316 of the embodiment of FIG. 3 need not necessarily be embodied as a single look-up table, but may be embodied as a series of two or more cascaded look-up tables. An entry in the first look-up table could point from a given multi-bit instruction code to a second look-up table, thereby reducing the amount of storage required in each look-up table for complex operator configurations. For example, the first look-up table could be organized into libraries of configuration categories, so that multiple multi-bit instruction codes are grouped together in the first look-up table with each group pointing to a subsequent look-up table that provides specific configurations for each multi-bit code of the group.

In accordance with the embodiment of FIG. 3, the operators are advantageously pre-configured into various operator classes. In practice, this is achieved by a strategic level of hardwiring. An advantage of this approach is that it means that fewer predefined configurations need to be stored, and the control circuitry can be simpler. For example, operators 318 are pre-configured to be in the class of multiply operators; operators 319 are pre-configured as ALU operators; operators 320 are pre-configured as state operators; and operators 321 are pre-configured as cross-lane permuters; and other pre-configured operator classes are possible. However, even though the classes of operators are pre-configured, there is run-time flexibility for instructions to be able to arrange at least: (i) connectivity of the operators within each class; (ii) connectivity with operators from the other classes; (iii) connectivity of any relevant switching means; for the final arrangement of a specific configuration for implementing a given algorithm.

A skilled reader will appreciate that, while the foregoing has described what is considered to be the best mode and where appropriate other modes of performing the invention, the invention should not be limited to specific apparatus configurations or method steps disclosed in this description of the preferred embodiment. Those skilled in the art will also recognize that the invention has a broad range of applications, and that the embodiments admit of a wide range of different implementations and modifications without departing from the inventive concepts. In particular, exemplary bit widths mentioned herein are not intended to be limiting, nor is the arbitrary selection of bit widths referred to as half words, words, long, etc.

What is claimed is:

1. A computer processor, the processor comprising:
    a decode unit for decoding a stream of instruction packets from a memory, each instruction packet comprising a plurality of instructions; and
    a processing channel comprising a plurality of functional units and operable to perform control processing operations;
    wherein the decode unit is operable to receive and decode instruction packets of a bit length of 64 bits and to detect, based on a single identification bit in the instruction packet, if the instruction packet defines three control instructions each having a bit length of 21 bits and wherein when the decode unit detects that the instruction packet comprises three such control instructions said control instructions are supplied to the processing channel for execution in the order in which they appear in the instruction.

2. A computer processor according to claim 1, wherein the processing channel comprises units selected from one or more of: a control register file; a control execution unit; a branch execution unit and a load/store unit.

3. A method of operating a computer processor which comprises a processing channel and capable of performing control processing operations having a plurality of functional units, the method comprising:
    (a) receiving a sequence of instruction packets from a memory, each of said instruction packets comprising a plurality of instructions defining operations, said instruction packets including a class of packets having a bit length of 64 bits;
    (b) decoding each instruction packet in turn by determining, based on a single identification bit in the instruction packet, if the instruction packet defines three control instructions each having a bit length of 21 bits; and
    (c) supplying said plurality of control instructions to said processing channel for execution in the order in which they appear in the instruction packet when the decode unit detects that the instruction packet comprises three such control instructions.

4. A computer program product comprising a non-transitory computer readable medium bearing a program code, which when processed by a computer, causes the computer to be operated according to the method of claim 3.

5. A non-transitory computer readable medium bearing a program code, comprising a sequence of instructions for causing a computer to be operated according to the method of claim 3.

6. A non-transitory computer readable medium bearing an instruction set for a computer including a class of instruction packets having a bit length of 64 bits, each of the instruction packets comprising three control instructions for execution sequentially with each of the three control instructions having a bit length of 21 bits, and a single identification bit that indicates the presence of the three control instructions having a bit length of 21 bits.

* * * * *